United States Patent Office 3,073,862
Patented Jan. 15, 1963

3,073,862
ALKYLENE-AROMATIC-ACETAMIDES
John G. Abramo and Earl C. Chapin, Springfield, Mass., assignors to Monsanto Chemical Company, St. Louis, Mo., a corporation of Delaware
No Drawing. Filed Dec. 5, 1958, Ser. No. 778,310
2 Claims. (Cl. 260—558)

The present invention is directed to alkylene-aromatic-methyl compounds and more particularly to alkylene-aromatic-acetic acids and their derivatives having the structure:

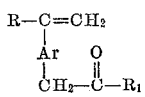

wherein Ar is an aromatic radical, R is selected from the class consisting of hydrogen and methyl radical and $R_1$ is selected from the class consisting of hydroxy, alkoxy, aryloxy, amino and halo radicals.

In the discussion which follows, subgeneric products resulting from variations carried out in the radical represented by the symbol $R_1$ will be indicated by reference to other more specific symbols. In accordance with this, the symbol $R_1$ is intended to include the following symbols: OH when acids are the subject of particularized discussion; X when acid halides are involved; $R_{1(a)}$ when alkyl esters are intended; $R_{1(b)}$ when aryl esters are intended; and $N(R_{1(c)})_2$ when amides are the subject of further discussion.

Vinyl aromatic compounds, because of the unsaturation contained in their alkylene substituent, are useful monomeric components which when polymerized form copolymers or homopolymers useful in coating, molding, film and other applications. Various of these compounds have added attractiveness, particularly in the coating field, if they contain functional groups, such as carboxyl or carbamyl groups which have the capacity to react further with melamine resins and other materials contributing a cross-linked product exhibiting added resistance to solvent attack. Then too, the presence of groups such as ester groups on the subject vinyl compounds, have been found to contribute toughening properties to the polymerized products. This is also a desirable attribute to have in materials designed for use in coating applications.

Accordingly, it is a principal object of the present invention to produce alkylene-aromatic-acetic acids and their derivatives.

Another object is to provide methods by which to obtain these compounds.

Other objects of the invention will in part be obvious and will appear hereinafter.

These and other objects of the invention are attained through production of alkylene-aromatic-acetic acids and their derivatives having the structure:

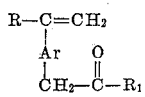

wherein Ar is an aromatic radical, R is selected from the class consisting of hydrogen and methyl radical and $R_1$ is selected from the class consisting of hydroxy, alkoxy, aryloxy, amino and halo radicals.

The following examples are given in illustration of the invention. Where parts are mentioned, parts by weight are intended unless otherwise described.

*Example I*

Charge 56 grams of potassium hydroxide, 100 ml. of ethanol (95%), 100 ml. of water and 43 grams of p-vinylbenzyl cyanide into a round-bottomed, three-neck 500 ml. flask fitted with a mechanical stirrer and a reflux condenser. Stir the mixture until the potassium hydroxide becomes dissolved and then heat to reflux temperature. Refluxing is continued for about 5 hours. The solution is then allowed to cool to room temperature followed by acidification with concentrated hydrochloric acid and transferred to a separatory funnel where it is extracted with three 100 ml. portions of ethyl ether. The ether extracts are combined and dried for three hours with magnesium sulfate. The desiccant is removed by filtration and the filtrate transferred to an evaporation dish where the ether is allowed to evaporate leaving a yellow solid which when recrystallized from hexane yields a white solid product. The neutralization equivalent of the product is determined to be 160 as compared to the theoretical value for p-vinylphenylacetic acid which is calculated to be 162. Elemental and infrared analysis confirm the material as p-vinylphenylacetic acid.

*Example II*

A 100 ml. round-bottomed, three-neck flask fitted with stirrer and condenser is charged with 32 grams of p-vinylphenylacetic acid. The flask is immersed in ice water and 30 grams of thionyl chloride is added thereto causing reaction to start. The reaction is allowed to proceed in the ice bath for 2 hours. The flask is then provided with a distilling head and condenser. The contents of the flask are distilled to provide about 20 grams of material boiling at 120–5° C./8 mm. of Hg. The distillate is analyzed by elemental and infrared techniques which indicate the presence of p-vinylphenylacetyl chloride.

*Example III*

A solution of 5 grams of p-vinylphenylacetyl chloride in 25 ml. of benzene is added dropwise to a solution comprising 3 grams of methanol and 5 grams of pyridine in 25 ml. of benzene, contained in a 100 ml. round-bottomed single-neck flask fitted with a magnetic stirrer. The resulting solution is then stirred for about 60 minutes after the addition is completed. The solution is then washed first with two 25 ml. portions of 10% sodium bicarbonate followed by two 15 ml. portions of water in a separatory funnel. The washed solution is transferred to a flask and desiccated with sodium sulfate, the latter being removed after about 12 hours by filtering. The solution which remains is transferred to a distillation apparatus and the benzene solvent removed at about 15 mm. Hg. The vacuum is intensified to about 2 mm. Hg whereupon a colorless liquid boiling at 110–115° C. is obtained. Infrared analysis of this liquid indicates the presence of vinyl, phenyl and ester groupings. Determination of the saponification equivalent and elemental analysis in view of the infrared analysis substantiate the identity of this liquid as methyl p-vinylphenylacetate.

*Example IV*

A solution of 5 grams of p-vinylphenylacetyl chloride in 25 ml. of benzene is added dropwise to a solution comprising 5 grams of phenol and 5.5 grams of pyridine in 25 ml. of benzene which is contained in a 100 ml. flask provided with a magnetic stirrer. The resulting solution is stirred for 90 minutes after addition is completed. The solution is then washed in a separatory funnel first with two 25 ml. portions of 10% sodium bicarbonate and then with two 15 ml. portions of water. This solution is collected in a flask and is dried with sodium sulfate. The desiccant is filtered off and the filtrate poured into an evaporating dish where the benzene solvent is allowed to evaporate. Recrystallization of the solid left after evaporation is complete, from ethanol yields a pale-yellow solid. Analysis of this solid product for carbon and hydrogen as well as infrared analysis indicates the compound to be phenyl p-vinylphenylacetate.

*Example V*

About 10 grams of p-vinylphenylacetyl chloride in 100 ml. of absolute ether is placed in a 250 ml. round-bottomed flask provided with a magnetic stirrer and a reflux condenser. Ammonia gas is conducted slowly into the flask through a coarse glass frit for a period of about 90 minutes. Ammonium chloride precipitates during the first hour of reaction. Upon completion of the reaction the ammonium chloride is filtered off and the filtrate is allowed to evaporate to yield a light-yellow solid which is then recrystallized from absolute alcohol. Nitrogen analysis of the recrystallized product indicates a value in agreement with the theoretical 9.3% nitrogen calculated for $C_{10}H_{11}ON$. Infrared analysis of the product indicates the presence of bonds associated with the carbamyl, vinyl and phenyl groups, thus identifying the compound as p-vinylphenylacetamide.

*Example VI*

Fifty-eight grams (0.3 mol) of 1-vinyl-4-naphthyl-acetonitrile is added dropwise to a solution of 56 grams of potassium hydroxide in 200 ml. of 95% ethanol and 100 ml. of water being refluxed in a 500 ml. round-bottomed, three-neck flask provided with a reflux condenser, dropping funnel and a stirrer. Refluxing and stirring of the solution is continued for 5 hours after the addition is completed. The solution is cooled to room temperature and acidified with concentrated hydrochloric acid. Precipitated solids are filtered off in a Büchner funnel and the solids dried overnight in a vacuum oven set at 50° C. The solid product is then combined with 400 ml. of hexane in a flask and refluxed for 15 minutes, and filtered while hot. The resulting filtrate is cooled in an ice bath and the sides of the flask are scratched to induce crystallization. A white solid settles out which is collected and dried in a vacuum desiccator at room temperature. The neutral equivalent and chemical analysis of this product is established as approaching the theoretical values for vinylnaphthylacetic acid. Infrared analysis performed on a portion of the product contained in a mineral oil vehicle indicates the presence of vinyl and carboxylic acid groups confirming the identity of the compound as 1-vinyl-4-naphthylacetic acid.

*Example VII*

Twenty grams of 1-vinyl-4-naphthylacetic acid is placed in a 100 ml. round-bottomed flask immersed in an ice bath. Seventeen grams of thionyl chloride is added to the acid. The flask is periodically swirled by hand. Gaseous hydrogen chloride and sulfur dioxide are evolved during the reaction covering a period of about 60 minutes. The reaction flask is then connected to a vacuum of 20 mm. Hg and heated on a steam bath to remove dissolved hydrogen chloride and sulfur dioxide as well as unreacted thionyl chloride. This procedure is continued for 30 minutes and the residue remaining behind is subjected to infrared analysis. The absence of a peak near 3.0 microns in the infrared spectrum of the compound indicates the hydroxyl group associated with carboxylic acids has been replaced with chlorine as would be expected for 1-vinyl-4-naphthylacetyl chloride.

*Example VIII*

A three-neck round-bottomed flask provided with a stirrer and reflux condenser is charged with 56 grams of potassium hydroxide dissolved in 200 ml. of 95% ethanol, 50 ml. of water and 75 grams of 9-vinyl-10-cyanomethyl-anthracene. The contents of the flask are heated at reflux temperature with stirring for a period of 6 hours and is then cooled to room temperature. The resulting reaction mixture is acidified with concentrated hydrochloric acid and filtered to isolate precipitated solids. The precipitate is dried overnight in a vacuum oven set at 50° C. The solid is recrystallized from ethanol as a white powder. The neutralization equivalent and the analytical valves for carbon and hydrogen correspond to the calculated valves for $C_{18}H_{14}O_2$ identifying this solid as 9-vinyl-10-anthrylacetic acid.

Broadly expressed, the alkylene-aromatic-methyl compounds of the present invention have the structure:

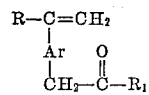

wherein Ar is an aromatic radical, R is in a class consisting of hydrogen and methyl radical and $R_1$ is selected from the class consisting of hydroxy, alkoxy, aryloxy, amino and halo radicals.

Considered first from the standpoint of the primary substituents to wit: the alkylene substituent and the carboxymethyl substituents, in a given compound each is singular in number. The alkylene substituent can be either a 2 or 3 carbon member having a single unsaturation. Variations as to the number of carbons contained in the carboxymethyl substituent will be detailed in the more specific discussion which follows in which each of the subclasses which result from variations carried out in radical $R_1$ will be discussed. With regard to the aromatic radical Ar, this can be phenyl, biphenyl, naphthyl, anthryl, acenaphthenyl and like radicals. These can have other or secondary nuclear substituents in addition to the primary substituents previously indicated; the former can include nitro, halo, and alkyl radicals.

The first subclass of compounds coming within this invention are the alkylene-aromatic-acetic acids having the structure:

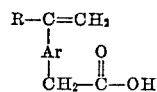

wherein Ar is an aromatic radical and R is selected from the class consisting of hydrogen and methyl radical.

The simplest examples of the subject acids are the o-, m- and p-vinylphenylacetic acids. When R is a methyl radical, the compounds are o-, m- and p-isopropenyl-phenylacetic acids. Replacement of the phenyl radical in the aromatic radical represented by the symbol Ar by a naphthyl radical results in compounds of the nature of vinylnaphthylacetic acids, isopropenylnaphthylacetic acids, including the position isomers resulting from various positioning of the alkylene radical and the carboxymethyl radical, the foregoing also being referred to as the primary substituents. Other compounds which result from substitutions carried out in the radical Ar, are exemplified by the vinylanthrylacetic acids, isopropenylanthrylacetic acids including the various position isomers resulting from variations carried out in positioning of the primary substituents. Still other variations result with the substitution of biphenyl radicals and other aromatic type radicals in aromatic radical Ar.

The alkylene-aromatic-acetic acids can be produced by hydrolysis of alkylene-aromatic-acetonitriles to the corresponding base metal salt followed by acidification to the subject acids. The alkylene-aromatic-acetonitriles used here are disclosed in the copending application, Serial No. 768,825, now abandoned. Hydrolysis is carried out in the presence of base metal hydroxides to form an intermediate base metal salt product, which is then acidified in situ, to produce the corresponding alkylene-aromatic-acetic acid. In illustration, p-vinylphenylacetonitrile is refluxed under atmospheric conditions with solutions of potassium hydroxide in alcohol-water mixtures to produce the potassium salt which is then acidified with sulfuric acid to produce p-vinylphenylacetic acid.

The second subclass of compounds coming within this invention are the alkylene-aromatic-acetyl halides having the structure:

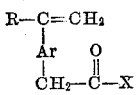

wherein Ar is an aromatic radical, R is selected from the class consisting of hydrogen and methyl radical and X is a halogen. The halogen can be bromine, chlorine, fluorine, iodine, with the preference directed to the chlorine. The simplest examples of these compounds are the o-, m-, and p-vinylphenylacetyl chlorides. Where R is a methyl radical, the compounds become o-, m-, and p-isopropenylphenylacetyl chlorides. Substitution for the phenyl radical in the aromatic radical represented by the symbol Ar, with a naphthyl radical results in compounds of the nature of vinylnaphthylacetyl chlorides, isopropenylnaphthylacetyl chlorides, while introduction of an anthryl radical results in compounds of the nature of vinylanthrylacetyl chlorides, isopropenylanthrylacetyl chlorides including position isomers of the preceding naphthyl and anthryl compounds resulting from variations carried out as to the positioning of the primary substituents thereon.

The alkylene-aromatic-acetyl halides can be obtained by reacting the corresponding alkylene-aromatic-acetic acid with an inorganic acid halide. As an example, the p-vinylphenylacetic acid is reacted with thionyl chloride to produce p-vinylphenylacetyl chloride.

The third subclass of compounds coming within this invention are the alkyl alkylene-aromatic-acetates having the structure:

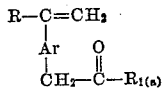

wherein Ar is an aromatic radical, R is selected from the class consisting of hydrogen and methyl radical and $R_{1(a)}$ is an alkoxy radical. Radical $R_{1(a)}$ is preferably restricted to alkoxy radicals the longest continuous alkyl straight chain of which contains 1–10 carbon atoms. The simplest examples of these are the methyl o-, methyl m-, and methyl p-vinylphenylacetates, methyl o-, methyl m-, and methyl p-isopropenylphenylacetates, ethyl o-, ethyl m-, and ethyl p-vinylphenylacetates, ethyl o-, ethyl m-, and ethyl p-isopropenylphenylacetates through the decyl o-, decyl m-, and decyl p-vinylphenylacetates and the decyl o-, decyl m-, and decyl p-vinylisopropenylphenylacetates. The alkoxy radical $R_{1(a)}$ may also have alkyl substituents to eventuate in products of the type illustrated by the 2-ethylhexyl o-, 2-ethylhexyl m-, and 2-ethylhexyl p-vinylphenylacetates and the 2-ethylhexyl o-, 2-ethylhexyl m-, and 2-ethylhexyl p-isopropenylphenylacetates. The alkoxy radical $R_{1(a)}$ can also have aryl substituents contained thereon to eventuate in products of the type illustrated by beta-phenylethyl o-, beta-phenylethyl m-, and beta-phenylethyl p-vinylphenyl acetates and the like. With variations carried out with respect to aromatic radical, represented by the symbol Ar, other compounds resulting are exemplified by the methyl vinylnaphthylacetates through the decyl vinylnaphthylacetates, methyl isopropenylnaphthylacetates through the decyl isopropenylnaphthylacetates, and with alkyl substituents on the alkoxy radical $R_{1(a)}$ products of the type illustrated by 2-ethylhexyl vinylnaphthylacetates, and with aryl substituents on alkoxy radical $R_{1(a)}$ products of the type illustrated by beta-phenylethyl vinylnaphthylacetates. Other examples include methyl vinylanthrylacetates through decyl vinylanthrylacetates, methyl isopropenylanthrylacetates through decyl isopropenylanthrylacetates with the variations mentioned previously with respect to the naphthyl-type compounds, i.e., resulting from alkyl and/or aryl substituents being present on the alkoxy radical $R_{1(a)}$. Variations as to the positioning of the alkylene and carboxymethyl substituents contained on the naphthyl and anthryl radicals, represented by the symbol Ar, can be practiced to produce desired isomers of the preceding compounds.

The alkyl alkylene-aromatic-acetates can be obtained by reacting the corresponding alkylene-aromatic-acetyl halide with an alkyl alcohol ($R_{1(a)}OH$), in which $R_{1(a)}$ corresponds to the identical alkyl radical of the desired alkyl alkylene-aromatic-acetate. As an example, p-vinylphenylacetyl chloride is reacted with methanol to produce methyl p-vinylphenylacetate.

The fourth subclass of compounds coming within this invention are aryl alkylene-aromatic-acetates having the structure:

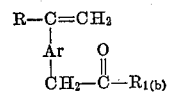

wherein Ar is an aromatic radical, R is selected from the class consisting of hydrogen and methyl radical and $R_{1(b)}$ is an aryloxy radical. Radical $R_{1(b)}$ is preferably restricted to aryloxy radicals containing 6–20 carbon atoms in their basic ring structures.

Examples of these acetates are the phenyl o-, phenyl m-, and phenyl p-vinylphenylacetates. Where R is a methyl radical, examples are the phenyl o-, phenyl m-, and phenyl p-isopropenylphenylacetates. The aryloxy radical $R_{1(b)}$ can have alkyl substituents contained thereon to eventuate in products exemplified by tolyl o-, tolyl m-, and tolyl p-vinylphenylacetates. With variations carried out with respect to the aromatic radical represented by the symbol Ar, other compounds result such as phenyl vinylnaphthylacetates, phenyl vinylanthrylacetates, phenyl isopropenylnaphthylacetates, and the like. With regard to the compounds having naphthyl, anthryl and other polycyclic radicals contained in the radical represented by the symbol Ar, various position isomers result from the relative positioning of the primary substituents, i.e., the alkylene substituent and the carboxymethyl substituent.

The aryl alkylene-aromatic-acetates can be produced by reacting the corresponding alkylene-aromatic-acetyl halide with an aryl alcohol ($R_{1(b)}OH$) wherein $R_{1(b)}$ corresponds to the identical aryl radical of the desired aryl alkylene-aromatic-acetate. As an example, p-vinylphenylacetyl chloride is reacted with phenol to produce phenyl p-vinylphenylacetate.

The fifth subclass of compounds coming within this invention are the alkylene-aromatic acetamides having the structure:

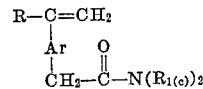

wherein Ar is an aromatic radical, R is selected from the class consisting of hydrogen and methyl radical and $R_{1(c)}$ is selected from the class consisting of hydrogen, alkyl radicals and mixtures of the same. When $R_{1(c)}$ represents an alkyl radical these are preferably limited to those containing 1–10 carbon atoms.

The simplest examples of the subject acetamides are the o-, m-, and p-vinylphenylacetamides. When R is a methyl radical exemplary compounds are o-, m-, and p-isopropenylacetamides. Acetamides in which $R_{1(c)}$ symbolizes a single alkyl radical, are represented by N-methyl-o-vinylphenylacetamide, N-methyl-m-vinylphenylacetamide, and N-methyl-p-vinylphenylacetamide, N-methyl-o-isopropenylacetamide, N-methyl-m-isopropenylacetamide, N-methyl-p-isopropenylacetamide, and where both of radicals $R_{1(c)}$ symbolize alkyl radicals representative compounds are N,N-dimethyl-o-vinylphenylacetamide, N,N-dimethyl-m-vinylphenylacetamide, and N,N-dimethyl - p-vinylphenylacetamide, N,N-dimethyl-o-isopropenylphenylacetamide, N,N - dimethyl-m-isopropenylphenylacetamide, and N,N-dimethyl-p-isopropenylphenylacetamide. With replacement of the phenyl radical in the aromatic radical represented by the symbol Ar, as by naphthyl radical compounds which result are of the nature of vinylnaphthylacetamides, N-methylvinylnaphthylacetamides, and N,N-dimethylvinylnaphthylacetamides. With the inclusion of an anthryl radical in the preceding manner representative compounds are vinylanthrylacetamides, N - methylvinylanthrylacetamides and N,N - dimethylanthrylacetamides. Various position isomers of the preceding naphthyl and anthryl compounds result from variations carried out in the positioning of the primary substituents to wit: the alkylene substituent and the acetamide substituent.

The alkylene-aromatic-acetamides can be obtained through reacting the corresponding alkylene-aromatic-acetyl halide with ammonia or an amine in an anhydrous solvent such as ethyl ether. Where the acetamide is to be a simple amide, ammonia is used. When substituted amides are desired, the reacting amine has a structure corresponding to the same. As examples: p-vinylphenylacetyl chloride is reacted with ammonia to provide p-vinylphenylacetamide while p-vinylphenylacetyl chloride is reacted with methylamine to produce N-methyl-p-vinylphenylacetamide.

It will thus be seen that the objects set forth above among those made apparent by the preceding description are efficiently attained and, since certain changes can be made in the products and in carrying out the process without departing from the scope of the invention, it is intended that all matter containing the above description is to be interpreted as illustrative and not in a limited sense.

What is claimed is:

1. Alkylene-aromatic-acetamides having the structure

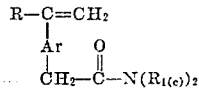

wherein Ar is a divalent aromatic radical selected from the group consisting of phenylene, biphenylene, naphthylene, acenaphthenylene and anthrylene and the nitro, halo and alkyl substituted derivatives thereof, R is selected from the group consisting of hydrogen and methyl and each $R_{1(c)}$ is selected from the group consisting of hydrogen, alkyl of from 1 to 10 carbon atoms.

2. p-Vinylphenylacetamide.

References Cited in the file of this patent

UNITED STATES PATENTS 2,650,250    Milne et al. _____ Aug. 25, 1953

OTHER REFERENCES

Jaffe: J.A.C.S., vol. 76, 5844 (1954).

Smirnov: Chemical Abstracts, vol. 52, pages 17, 160 (1958).